US008327357B2

(12) United States Patent
Amsden

(10) Patent No.: US 8,327,357 B2
(45) Date of Patent: Dec. 4, 2012

(54) MECHANISM FOR VIRTUAL TIME STAMP COUNTER ACCELERATION

(75) Inventor: Zachary Roger Amsden, Kailua, HI (US)

(73) Assignee: Red Hat, Inc., Raleigh, NC (US)

( * ) Notice: Subject to any disclaimer, the term of this patent is extended or adjusted under 35 U.S.C. 154(b) by 594 days.

(21) Appl. No.: 12/551,288

(22) Filed: Aug. 31, 2009

(65) Prior Publication Data

US 2011/0055828 A1    Mar. 3, 2011

(51) Int. Cl.
*G06F 9/455* (2006.01)
(52) U.S. Cl. .......................................................... 718/1
(58) Field of Classification Search ................. 718/1
See application file for complete search history.

(56) References Cited

U.S. PATENT DOCUMENTS

| 8,020,020 B2* | 9/2011 | Serebrin | 713/375 |
| 8,086,890 B2* | 12/2011 | Song | 713/500 |
| 2006/0130059 A1* | 6/2006 | Bennett et al. | 718/1 |
| 2010/0250230 A1* | 9/2010 | Ganguly et al. | 703/26 |
| 2010/0251235 A1* | 9/2010 | Ganguly et al. | 718/1 |

OTHER PUBLICATIONS

Chen et al, "Implementation of Virtual Time System for the Distributed Virtual Machine Monitor", IEEE, Sep. 29, 2009, pp. 571-576.*
VMware, "Timekeeping in VMware Virtual Machines", VMware ESX 3.5/ESXi 3.5, VMware Workstation 6.5, Oct. 17, 2008, pp. 1-26.*

* cited by examiner

*Primary Examiner* — Jennifer To
(74) *Attorney, Agent, or Firm* — Lowenstein Sandler PC

(57) ABSTRACT

A mechanism for virtual time stamp counter acceleration is disclosed. A method of embodiments of the invention includes setting a virtual machine (VM) time stamp counter (TSC) to a hyper-fast rate, receiving control of the VM due to a VM exit caused by the VM issuing an instruction that reads the VM TSC, and adjusting the VM TSC with a value of an offset counter associated with the VM.

16 Claims, 4 Drawing Sheets

MECHANISM FOR VIRTUAL TIME STAMP COUNTER ACCELERATION

TECHNICAL FIELD

The embodiments of the invention relate generally to virtual machine systems and, more specifically, relate to a mechanism for virtual time stamp counter acceleration.

BACKGROUND

Many modern computers contain a time stamp counter, or TSC, which is a simple counter, incremented at each CPU clock cycle. Thus, the TSC is tied to the CPU frequency of the particular computer on which it is running.

In a virtual machine (VM) environment, the TSC for each VM may be simulated in several ways. Instructions which read the counter may be trapped, allowing a hypervisor to modify the apparently observed counter value; or the counter may be passed through directly to a guest operating system (OS). The latter approach avoids the hypervisor trap, which can present a performance problem when there is frequent use of the TSC. However, presenting the TSC directly to the guest VM is problematic because the TSCs of different processors on a machine may not be synchronized. Furthermore, it is problematic because the guest may attempt to reset the apparent TSC counter, but the hypervisor cannot allow such a reset of the underlying TSC because it would interfere with the operation of the hypervisor itself. In addition, setting the TSC to an arbitrary value may not be possible on all hardware platforms.

Some newer hardware virtualization technologies allow an offset to be added to the TSC when running a virtual machine. This allows the hypervisor to modify the apparent guest TSC without any performance penalty, while allowing for simulation of a reset and also preserving the desirable feature of presenting a zero TSC counter to a guest VM upon boot.

Unfortunately, none of these above-described techniques can accommodate for a change in the TSC frequency of a processor. The TSC frequency of a processor may change in one of two ways. First, some CPUs support what is known as frequency scaling: the processor frequency is increased or decreased according to performance requirements. Second, the underlying TSC rate may change upon migration to a different computer, which is a common occurrence for VMs in particular. As a result of a processor's TSC frequency change, time as measured by the TSC moves either faster or slower, depending on whether the TSC rate associated with the new processor speed is faster or slower, respectively, than the old processor speed.

The calculation of the TSC speed is typically done only once, during the boot process of the VM. Currently, there is no reliable standard for informing the VM of a change in speed so it may compensate for its virtual TSC. Further, even if there were such a standard, many guest OSs are not equipped to deal with such a change as they have been written to assume this TSC speed is fixed over the operation of the machine. As such, a mechanism to accommodate a VM TSC when there is a change in underlying processor speed would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
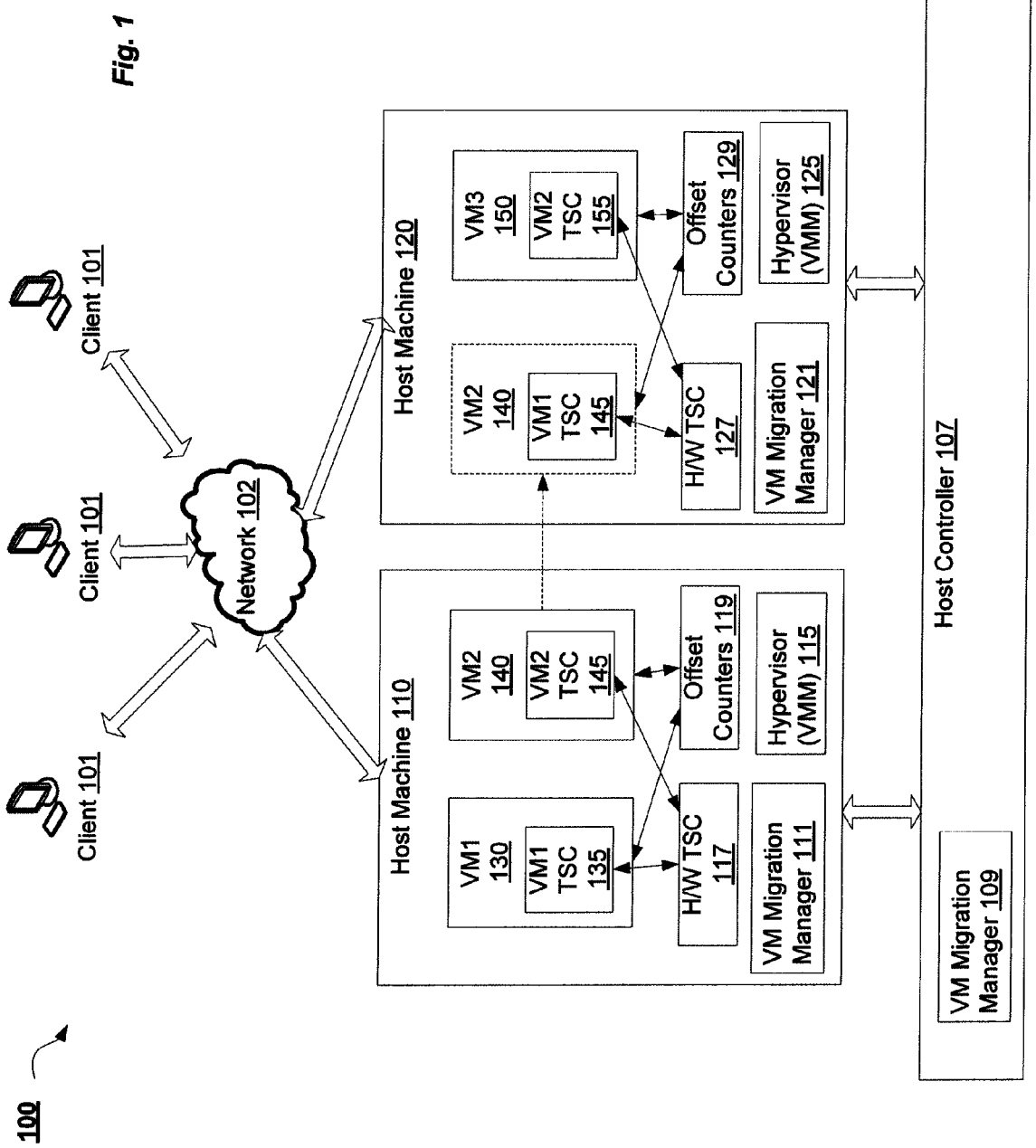
FIG. 1 is a block diagram of an exemplary network architecture in which embodiments of the present invention may operate.

Embodiments of the invention provide a mechanism for virtual time stamp counter acceleration. A method of embodiments of the invention includes setting a virtual machine (VM) time stamp counter (TSC) to a hyper-fast rate, receiving control of the VM due to a VM exit caused by the VM issuing an instruction that reads the VM TSC, and adjusting the VM TSC with a value of an offset counter associated with the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for virtual time stamp counter (TSC) acceleration. Virtual TSC acceleration in embodiments of the invention is achieved by providing a virtual TSC that survives fluctuations of the underlying hardware TSC, which may both increase and decrease in speed across migrations or CPU frequency scaling events. In one embodiment, the method by which this is done relies on: 1) continuous knowledge of the current hardware TSC frequency; 2) a hardware TSC offsetting capability; 3) a programmable high resolution hardware timer. Embodiments of the invention present an unreasonably high TSC rate to a virtual machine (VM) during the boot process, and subsequently the VM uses this apparently very high clock rate for all future TSC-based calculations.

FIG. 1 is a block diagram of an exemplary network architecture 100 in which embodiments of the present invention may operate. The network architecture 100 includes a cluster of host machines 110, 120 coupled to one or more clients 101 over a network 102. The network 102 may be a private network (e.g., a local area network (LAN), a wide area network (WAN), intranet, etc.) or a public network (e.g., the Internet). In one embodiment, host machines 110, 120 may be known as host computing devices that include at least a processor and a memory. Each host machine 110, 120 may be a server computer that includes one or more virtual machines (VMs) 130, 140, 150. In some embodiments, although not illustrated, clients 101 may be hosted directly by host machine 110, 120 as a local client on host machine 110, 120.

The clients 101 may include computing devices that have a wide range of processing capabilities. Some of the clients 101 may be thin clients, which have limited processing and memory capacities. For example, a thin client may a laptop computer, cellular phone, personal digital assistant (PDA), a re-purposed desktop computer, etc. Some of the clients 101 may be thick (fat) clients, which have powerful CPUs and large memory. For example, a thick client may be a dual-core or multi-core computer, workstation, graphics workstation, etc. The client 101 may run client applications such as a Web browser and a graphic user interface (GUI). The client 101 may also run other client applications, which receive multimedia data streams or other data from one or more host computers 110, 120 and re-direct the received data to a local display or other user interface.

As mentioned previously, each host machine 110, 120 may run one or more VMs 130, 140, 150. Each VM 130, 140, 150 runs a guest operating system (OS) that may be different from one VM to another. The guest OS may include Microsoft Windows, Linux, Solaris, Mac OS, etc. Furthermore, each host machine 110, 120 may include a hypervisor 115, 125 that emulates the underlying hardware platform for the VMs 130, 140, 150 that it hosts. The hypervisor 115, 125 may also be known as a virtual machine monitor (VMM) or a kernel-based hypervisor. In some embodiments, the hypervisor 115, 125 is part of a host operating system.

In one embodiment, each VM 130, 140, 150 can be accessed by one or more of the clients 101 over the network 102. In one scenario, each VM 130, 140, 150 provides a virtual desktop for the client 101. From the user's point of view, the virtual desktop functions as a physical desktop (e.g., a personal computer) and is indistinguishable from a physical desktop.

In some embodiments, the host machines 110, 120 may be managed by a host controller 107. The host controller 107 may be a separate machine coupled to the host machines 110, 120 directly or via a network. Alternatively, the host controller 107 may be part of one of the host machines 110, 120. The host controller 107 may add a VM 130, 140, 150, delete a VM 130, 140, 150, balance the load on the cluster of host machines 110, 120, provide directory service to the VMs 130, 140, 150, and perform other managerial functions.

Each host machine 110, 120 includes a hardware TSC 117, 127. The hardware TSC 117, 127 is typically a register that counts the number of ticks since reset of the host machine 110, 120. In some implementations, the hardware TSC 117, 127 increments with every clock cycle of a CPU in the host machine 110, 120. In the virtualized systems of VMs 130, 140, 150, a TSC is simulated as VM TSC 135, 145, 155. In one embodiment, the host machine 110, 120 has one or more control fields for each VM 130, 140, 150 that allow for the adding of an offset to the virtual TSC 135, 145, 155 for that VM 130, 140, 150. In such a case, the hardware TSC 117, 127 may be read directly by the VM 130, 140, 150, and the value of the hardware TSC 117, 127 may then be added to the value of the offset specified in the control field. This allows the hardware TSC 117, 127 to be read without the hypervisor 115, 125 having to trap instructions from the VM 130, 140, 150 that read the hardware TSC 117, 127.

In embodiments of the invention, the rate of VM TSC 135, 145, 155 is set at initialization of the associated VM 130, 140, 150. Then, any instructions executed by the VM 130, 140, 150 that read the VM TSC 135, 145, 155 are trapped by the hypervisor 115, 125, allowing the hypervisor 115, 125 to modify the apparently observed VM TSC 135, 145, 155 value. Such a technique works cleanly when the VM TSC 135, 145, 155 runs at the same rate as the underlying hardware TSC 117, 127. However, when a VM 130, 140, 150 is operating on hardware with a different CPU frequency (and as a result, a different hardware TSC frequency) than the virtual TSC frequency, time as measured by the hardware TSC 117, 127 will appear to move either faster or slower than real time.

Embodiments of the invention provide a method for a virtual TSC 135, 145, 155 to survive fluctuations of the underlying hardware CPU frequency. Fluctuations of underlying hardware CPU frequency may occur due to a variety of events, including migrations of VMs to systems with different processor speed and CPU frequency scaling events, to name a few examples.

As illustrated, FIG. 1 depicts the exemplary scenario of a VM migration resulting in a change in underlying hardware TSC 117, 127 rate, without a corresponding change in the VM TSC 135, 145, 155 rate. VM2 140 is shown being migrated from host machine 110 to host machine 120. A VM migration manager 109, 111 manages the migration process of the VM 140. In one embodiment, the VM migration manager is located on the individual host machines 110, 120. In other embodiments, the VM migration manager may be located on the host controller 107. In other further embodiments, implementations of the VM migration manager may be located on both the host machines 110, 120 (111) and the host controller 107 (109) simultaneously, or an independent machine.

It should be assumed that the CPU frequency of host machine 120 is faster than the CPU frequency of host machine 110. As such, embodiments of the invention provide a mechanism to handle this change in underlying hardware frequency while the VM TSC 135, 145, 155 rate remains the same. Embodiments of the invention present a very high TSC rate (also called a "hyper-fast rate") to the guest VM 130, 140, 150 during the boot process of the VM 130, 140, 150. The VM 130, 140, 150 subsequently uses this apparently hyper-fast clock rate for all future TSC-based 135, 145, 155 calculations.

In one embodiment, a virtual TSC rate is used that is higher than should ever be encountered on real hardware. As such, embodiments of the invention use a faster than normal VM TSC rate 135, 145, 155. In one embodiment, the VM TSC 135, 145, 155 rate is set at 4 GHz, as some legacy operating systems are not able to handle anything more than this speed.

In one embodiment, the illusion of the apparently hyper-fast TSC rate is created by continuously interrupting the VM 130, 140, 150 operations via an exit to the hypervisor 117, 127 upon any instructions to read the VM TSC 135, 145, 155. Once the VM 130, 140, 150 is interrupted, the hypervisor 117, 127 adjusts the VM TSC 135, 145, 155 with value from TSC offset counters 119, 129 that is calculated to bring the apparent TSC value 135, 145, 155 up to what the elapsed TSC value of the hyper-fast TSC rate would be. In one embodiment, an offset counter 119, 129 exists for each VM. The offset counters 119, 129 are stored in either a processor register or in a data structure called the VM control block within the host machine 110, 120. The VM control block is stored in memory and the hypervisor 117, 127 may access it.

Upon a change in the rate of the underlying hardware TSC 117, 127, only the value in the offset counter 119, 129 associated with the VM needs to be adjusted according to the new difference between the hyper-fast VM TSC rate and the actual frequency of the processor. In one embodiment, if a processor that runs faster than the apparent hyper-fast TSC rate that has been set in the VM is ever encountered, then the VM may simply begin utilizing a trap and emulate approach for all instructions that read the virtual TSC 135, 145, 155.

As a result of the frequent adjustments of the VM TSC 135, 145, 155, time in the VM 130, 140, 150 is divided into many discontinuous intervals during which the TSC 135, 145, 155 proceeds at the underlying rate of the hardware TSC 117, 127, followed by a leap (due to the above described offset counter adjustment) that brings it back into sync with the hyper-fast TSC rate. The frequent adjustment of VM TSC 135, 145, 155 due to many exits and entries of the hypervisor 117, 127 mean that the fake counter frequency of the VM TSC 135, 145, 155 will not adversely affect the VM 130, 140, 150. Furthermore, the discontinuous intervals of embodiments of the invention will never present a negative increase in the TSC value, avoiding the above described issue with backwards running TSC values.

The discontinuous intervals resulting from embodiments of the invention will be observed by the VM 130, 140, 150. However, the granularity at which they are presented can be controlled to make them virtually undetectable (by using hundreds of thousands of intervals per second), or make them very visible (by using few, if any forced intervals per second). In one embodiment, this granularity can also be varied dynamically at runtime, by programming a high resolution fallback timer (not shown) to interrupt at a rate as required. Often times, the VMs 130, 140, 150 may need high granularity of TSC simulation during boot time when counters and timers are calibrated, and, in contrast, can deal with low granularity during normal system operations.

In one embodiment, the fallback timer may be a local timer of the host machine 110, 120 processor (e.g., an APIC timer) that could be programmed to interrupt the processor at desired set intervals. Upon expiration of one of set intervals of the fallback timer, the hypervisor 115, 125 would update the VM TSC 135, 145, 155 of the currently-running VM 130, 140, 150. For example, setting a fallback timer to expire 1000 times a second ensures that the VM TSC 135, 145, 155 will be updated every millisecond with the counter offset for the VM 130, 140, 150. In such a situation, there will be at most 1 ms of measurement error.

Figure 2:
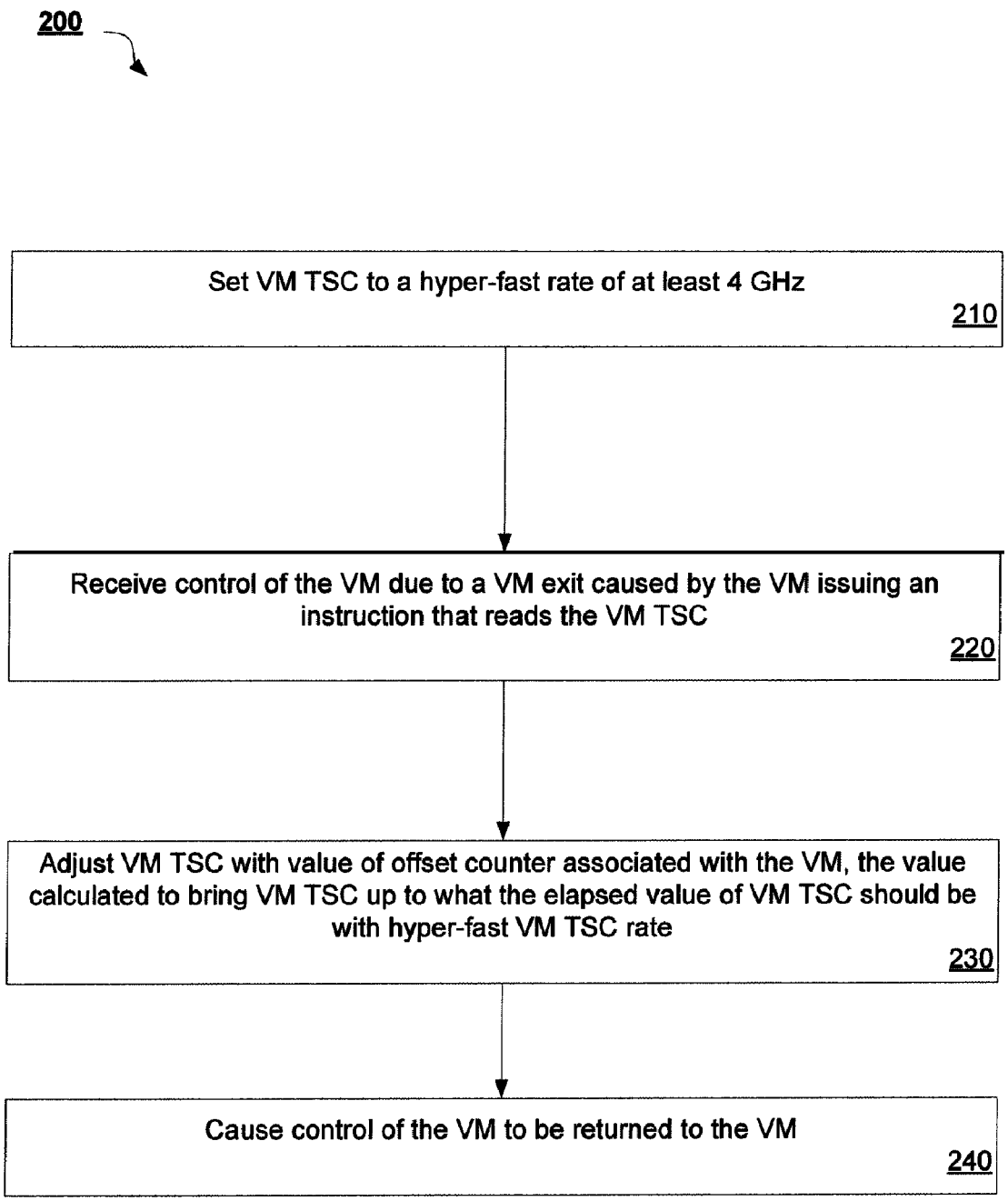
FIG. 2 is a flow diagram illustrating a method for virtual time stamp counter (TSC) acceleration according to an embodiment of the invention.

FIG. 2 is a flow diagram illustrating a method 200 for virtual TSC acceleration according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by hypervisor 115, 125 of host machine 110, 120 described with respect to FIG. 1.

Method 200 begins at block 210 where a VM TSC is set to a hyper-fast rate. In one embodiment, the hyper-fast rate is at least 4 GHz. In other embodiments, the hyper-fast rate is a rate that is higher than should ever be encountered on real hardware. In some embodiments, the setting of the VM TSC to the hyper-fast rate is done either prior to initialization of the VM or during initialization of the VM. At block 220, the hypervisor receives control due to a VM exit that is caused by a VM issuing an instruction that reads the VM TSC.

Subsequently, at block 230, the VM TSC is adjusted with a value of an offset counter associated with the VM. In one embodiment, the value of the offset counter is calculated so as to bring the VM TSC up to what the elapsed value of the VM TSC should be with the hyper-fast VM TSC rate. Lastly, at block 240, the hypervisor causes control to be returned back to the VM. In one embodiment, control of the VM is returned to the VM via a VM entry instruction.

Figure 3:
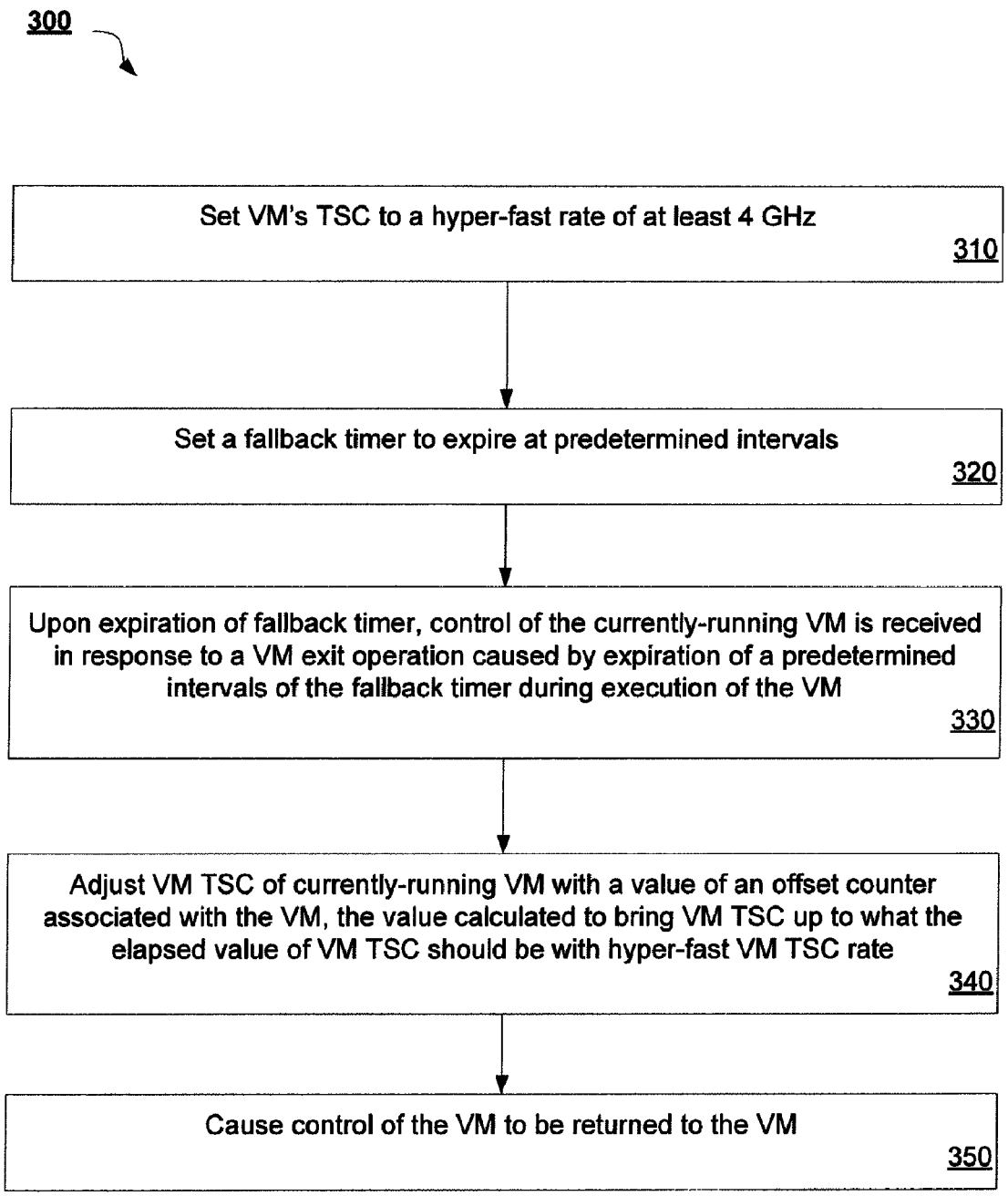
FIG. 3 is a flow diagram illustrating a method for virtual time stamp counter (TSC) acceleration augmented with a fallback timer according to an embodiment of the invention.

FIG. 3 is a flow diagram illustrating a method 300 for virtual TSC acceleration augmented with a fallback timer according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by hypervisor 115, 125 of host machine 110, 120 described with respect to FIG. 1.

Method 300 begins at block 310 where the VM TSC of those VMs is set to a hyper-fast rate. In one embodiment, the hyper-fast rate is at least 4 GHz. In other embodiments, the hyper-fast rate is a rate that is higher than should ever be encountered on real hardware. In some embodiments, the setting of the VM TSC to the hyper-fast rate is done either prior to initialization of the VM or during initialization of the VM At block 320, a fallback timer is set to expire at predetermined intervals. In one embodiment, the fallback timer is part of a host machine of the hypervisor. In other embodiments, there is a fallback timer set for each VM. At block 330, control is received at the hypervisor in response to a VM exit caused by the expiration of one of the predetermined intervals of the fallback timer during the operation of the VM.

Subsequently, at block 340, the VM TSC of the currently-running VM is adjusted with a value of an offset counter associated with the VM. In one embodiment, the value of the offset counter is calculated so as to bring the VM TSC up to what the elapsed value of the VM TSC should be with the hyper-fast VM TSC rate. Lastly, at block 350, the hypervisor causes control of the VM to be returned back to the VM. In some embodiments, methods 200 and 300 may be executed either separately or concurrently.

Figure 4:
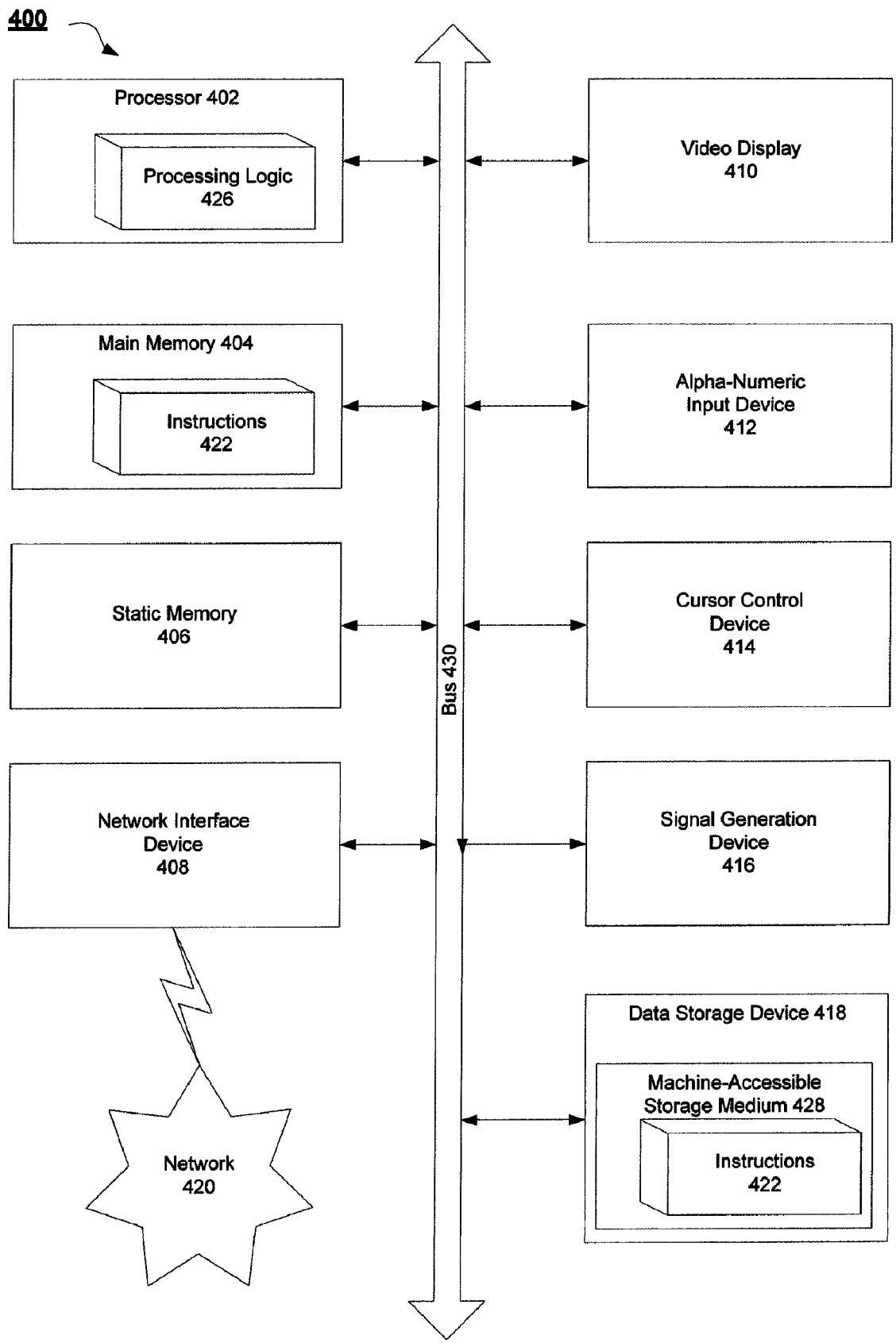
FIG. 4 illustrates a block diagram of one embodiment of a computer system.

The result of embodiments of the invention is a system that is capable of surviving the normal stresses of boot CPU clock calibration and can also cope with underlying TSC frequency changes, such as those encountered by either frequency scaling or migration operations. The variability of this granularity also allows for simulation of guests that have stricter timing requirements than can normally be reliably simulated in VMs (at a cost of performance for the greater interrupt rate). In embodiments of the invention, reading of the hardware TSC does not need to cause a trap or exit to the hypervisor. Instead, the TSC offset in the virtual machine control field is periodically changed to keep the apparent hardware TSC, as read directly by the VM, consistent with the virtual TSC frequency over time FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform methods 200 and 300 to provide virtual time stamp counter acceleration as described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
setting, by a hypervisor of a host machine, a virtual machine (VM) time stamp counter (TSC) to a hyper-fast rate, the hyper-fast rate of the VM TSC set faster than a central processing unit (CPU) rate of the host machine;
receiving, by the hypervisor, control of the VM due to a VM exit caused by the VM issuing an instruction that reads the VM TSC; and
adjusting, by the hypervisor, the VM TSC with a value of an offset counter associated with the VM in order to maintain the hyper-fast rate, wherein the value of the offset counter associated with the VM is calculated to bring the VM TSC to an updated value equal to an elapsed value of the VM TSC that accounts for the hyper-fast rate, and wherein the value of the offset counter changes upon a change in a frequency of a CPU in the host machine.

2. The method of claim 1, further comprising causing, by the hypervisor, control of the VM to be returned to the VM upon an occurrence of a VM entry instruction.

3. The method of claim 1, further comprising:
setting a fallback timer to expire at predetermined intervals; and
receiving control of the VM due to a VM exit caused by the expiration of one of the predetermined intervals of the fallback timer.

4. The method of claim 1, wherein the change in the frequency of the CPU is caused by at least one of a migration of the VM to another host machine or a frequency scaling event of the CPU.

5. The method of claim 1, wherein if a frequency of the CPU of the host machine is faster than the hyper-fast rate, then reading a hardware TSC of the host machine directly using the offset counter instead of adjusting the VM TSC with the value of the offset counter.

6. The method of claim 1, wherein the hyper-fast rate is 4 GHz.

7. A system, comprising:
a memory;
a processing device, communicably coupled to the memory;
one or more offset counter communicably coupled to the memory and the processing device;
one or more virtual machines (VMs) executed by the processing device-from the memory and communicably coupled to the one or more offset counters; and
a hypervisor communicably coupled to the one or more VMs in order to manage the one or more VMs under a kernel-based virtualization model, the hypervisor operable to:
set a VM time stamp counter (TSC) to a hyper-fast rate, the hyper-fast rate of the VM TSC set faster than a rate of the processing device;
receive control of the VM due to a VM exit caused by the VM issuing an instruction that reads the VM TSC; and
adjust the VM TSC with a value of one of the offset counters associated with the VM in order to maintain the hyper-fast rate;
wherein the value of the offset counter associated with the VM is calculated to bring the VM TSC to an updated value equal to an elapsed value of the VM TSC that accounts for the hyper-fast rate; and
wherein the value of the offset counter changes upon a change in a frequency of the processing device.

8. The system of claim 7, wherein the hypervisor further operable to cause control of the VM to be returned to the VM upon an occurrence of a VM entry instruction.

9. The system of claim 7, wherein the hypervisor further operable to:
set a fallback timer to expire at predetermined intervals; and
receive control of the VM due to a VM exit caused by the expiration of one of the predetermined intervals of the fallback timer.

10. The system of claim 7, wherein the change in the frequency of the processing device is caused by at least one of a migration of the VM to another host machine or a frequency scaling event of the processing device.

11. The system of claim 7, wherein if a frequency of the processing device is faster than the hyper-fast rate, then the hypervisor to read a hardware TSC of the system directly using the offset counter associated with the VM instead of adjusting the VM TSC with the value of the offset counter.

12. The system of claim 7, wherein the hyper-fast rate is 4 GHz.

13. A non-transitory machine-readable storage medium including data that, when accessed by a machine, cause the machine to perform operations comprising:
setting, by a hypervisor of a host machine, a virtual machine (VM) time stamp counter (TSC) to a hyper-fast rate, the hyper-fast rate of the VM TSC set faster than a central processing unit (CPU) rate of the host machine;
receiving, by the hypervisor, control of the VM due to a VM exit caused by the VM issuing an instruction that reads the VM TSC; and
adjusting, by the hypervisor, the VM TSC with a value of an offset counter associated with the VM in order to maintain the hyper-fast rate, wherein the value of the offset counter associated with the VM is calculated to bring the VM TSC to an updated value equal to an elapsed value of the VM TSC that accounts for the hyper-fast rate, and wherein the value of the offset counter changes upon a change in a frequency of a CPU in the host machine.

14. The non-transitory machine-readable storage medium of claim 13, the machine-readable storage medium includes data that, when accessed by the machine, cause the machine to perform further operations comprising causing control of the VM to be returned to the VM upon an occurrence of a VM entry instruction.

15. The non-transitory machine-readable storage medium of claim 13, the machine-readable storage medium includes data that, when accessed by the machine, cause the machine to perform further operations comprising:
setting a fallback timer to expire at predetermined intervals; and
receiving control of the VM due to a VM exit caused by the expiration of one of the predetermined intervals of the fallback timer.

16. The non-transitory machine-readable storage medium of claim 13, wherein the change in the frequency of the CPU in the host machine is caused by at least one of a migration of the VM to another host machine or a frequency scaling event of the CPU.

* * * * *